(12) United States Patent
Hurst et al.

(10) Patent No.: US 6,192,404 B1
(45) Date of Patent: Feb. 20, 2001

(54) DETERMINATION OF DISTANCE BETWEEN NODES IN A COMPUTER NETWORK

(75) Inventors: Stephen A. Hurst, Nashua, NH (US); Dah Ming Chiu, Acton, MA (US); Stephen R. Hanna, Bedford, MA (US); Radia J. Pearlman, Acton, MA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/079,504

(22) Filed: May 14, 1998

(51) Int. Cl.[7] .................................................. G06F 15/173
(52) U.S. Cl. ........................ 709/224; 709/223; 709/227; 709/228; 709/238; 709/242; 370/238
(58) Field of Search ............................ 709/212, 216–218, 709/223–224, 227–228, 238–242, 300, 302–304; 370/235–238, 248, 351, 400–402

(56) References Cited

U.S. PATENT DOCUMENTS

| 5,519,704 | | 5/1996 | Farinacci et al. ..................... 370/402 |
| 5,577,237 | * | 11/1996 | Lin ......................................... 713/500 |
| 5,596,719 | * | 1/1997 | Ramakrishnan et al. ............ 709/241 |
| 5,675,741 | | 10/1997 | Aggarwal et al. .................... 709/242 |
| 5,740,366 | * | 4/1998 | Mahany et al. ...................... 709/227 |
| 5,870,564 | * | 2/1999 | Jensen et al. ........................ 709/241 |
| 5,870,605 | * | 2/1999 | Bracho et al. ....................... 709/302 |
| 5,881,243 | * | 3/1999 | Zaumen et al. ...................... 709/241 |
| 5,933,849 | * | 8/1999 | Srbljic et al. ........................ 709/216 |
| 5,963,544 | * | 10/1999 | Ding et al. ........................... 709/242 |

OTHER PUBLICATIONS

Dube, et al. "Signal Stability–Based Adaptive Routing (SSA) for Ad Hoc Mobile Networks," IEEE Personal Communications, Feb. 1997, pp. 36–45.

Marzo, et al. "Multicast Algorithms Evaluation Using an Adaptive Routing in ATM Networks," The Institution of Electrical Engineers, XP002115044, London, 1994.

* cited by examiner

Primary Examiner—Zarni Maung
Assistant Examiner—Bharat Barot
(74) Attorney, Agent, or Firm—James D. Ivey, Esq.

(57) ABSTRACT

A base node of a computer network sends concurrent TTL query messages using multicast to other receiving nodes of the computer network. Each of the TTL query messages has a different time-to-live (TTL) parameter value and records the TTL parameter of the TTL query message into a message body. The receiving nodes receive one or more of the TTL query messages, namely, those TTL query messages whose TTL parameter values are sufficient to allow the TTL query message to reach the receiving node. Each receiving node can determine the TTL distance to the receiving node from the base node by determining the lowest TTL parameter value of all TTL query messages which reached the receiving node. Each receiving node communicates the TTL distance by sending to the base node a TTL query response message which indicates, in the message body, the least TTL parameter value of all TTL query messages received by the receiving node. Accordingly, the base node can determine TTL distances to other nodes of the computer network very quickly.

34 Claims, 10 Drawing Sheets

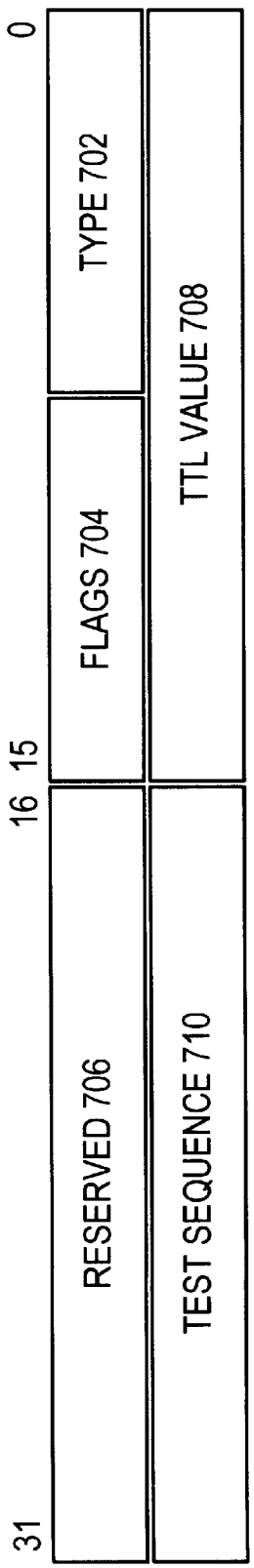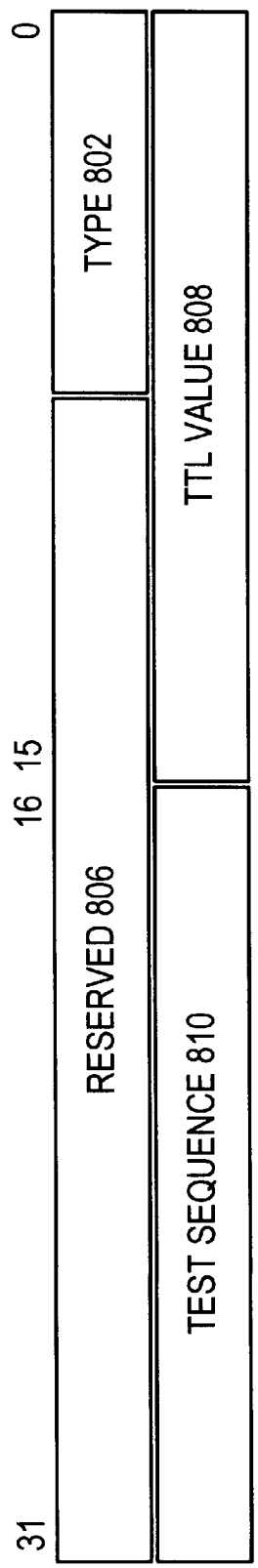
FIGURE 7
FIGURE 8

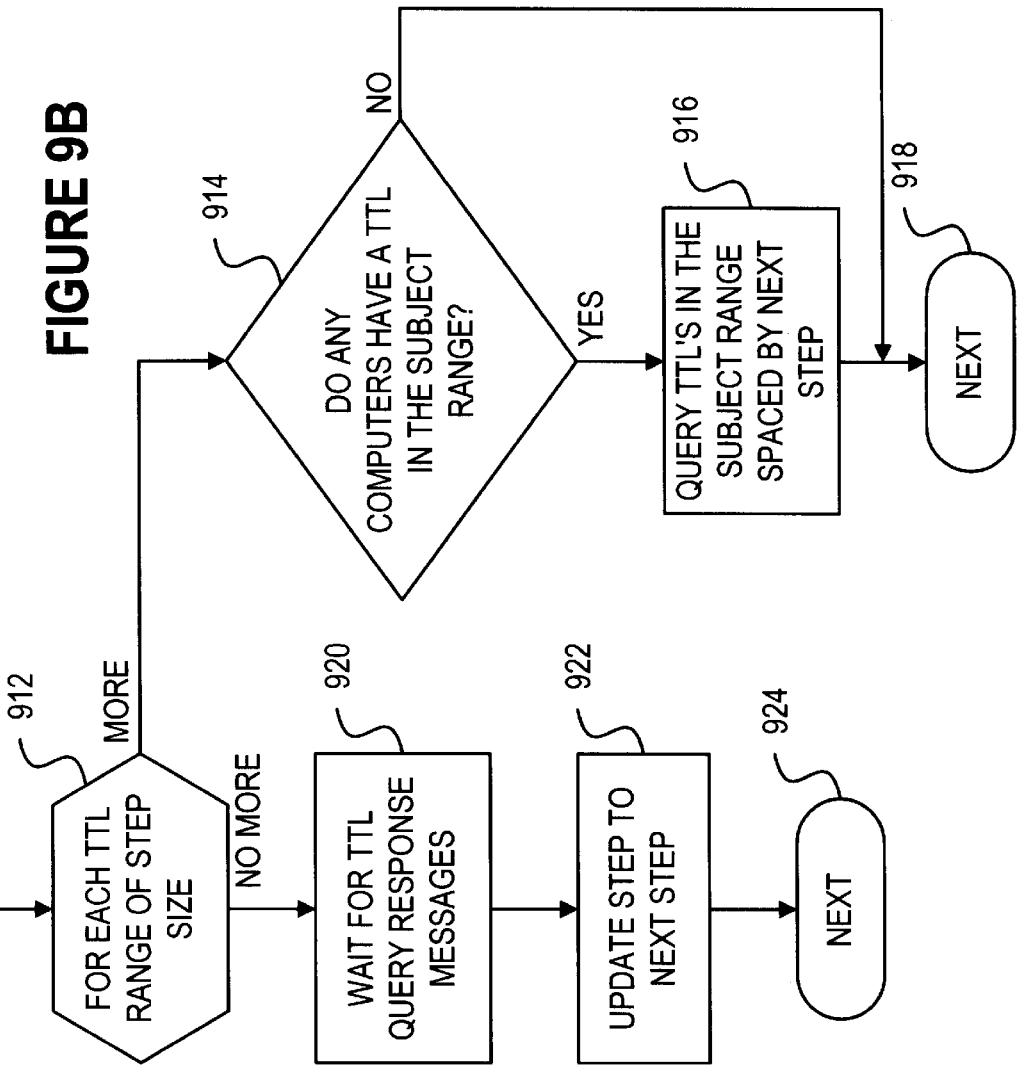

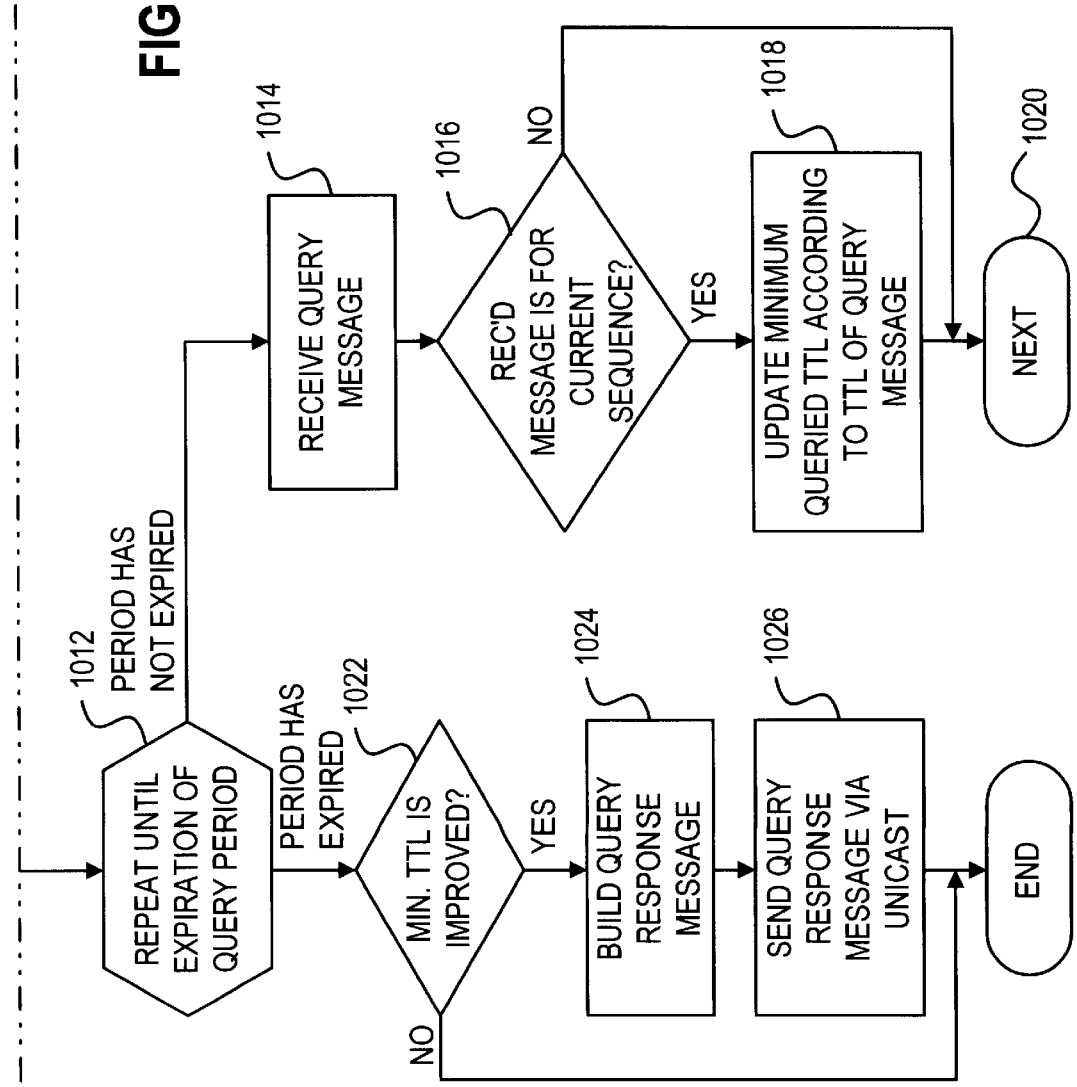

DETERMINATION OF DISTANCE BETWEEN NODES IN A COMPUTER NETWORK

FIELD OF THE INVENTION

The present invention relates to computer networks and, in particular, to a particularly effective mechanism for determining distances between nodes of a computer network when time-to-live (TTL) parameters of the headers of messages are not accessible.

BACKGROUND OF THE INVENTION

Networks of computer systems are ubiquitous in our society and such networks range in size from two-computer local area networks to wide area networks which include thousands of computers and which span the entire world. It is frequently desirable to send a message to many other computers of a computer network.

Multicasting is a mechanism by which a relatively low number of messages can be used to convey a message to many computers of a computer network. Consider, for example, computer network 100 shown in FIG. 1. Suppose computer 102A has a message to send to all computers 102B-Y of computer network 100. Through multicast, computer 102A forms a single copy of the message and sends the message to computers 102B-D to which computer 102A is directly coupled through computer network 100 as shown. Computer 102D recognizes the message as multicast and forms additional copies to send to computers 102E-H, to which computer 102D is directly coupled through computer network 102D as shown. Similarly, computer 102H forwards copies of the message to computers 102J-L, and the message is propagated through computer network 100 to all of computers 102B-Y.

Unicast is a messaging protocol in which each message has an intended recipient. Using unicast to send a message from computer 102A to computers 102B-Y involves twenty-two separate messages transmitted through the portion of computer network 100 between computers 102A and 102D. By comparison, multicast transmits a single message through that portion of computer network 100. The efficiency of multicast relative to unicast is relatively modest in this illustrative example in comparison to multicast messages through wide-area networks which include thousands of computers.

It is frequently desirable to send messages to a local portion of a wide-area network. Messages therefore include a time-to-live (TTL) parameter which establishes a condition for expiration of a multicast message. The TL parameter of a multicast message is initialized by the sending computer and is decreased by each computer which forwards the multicast message. In some networks, the TTL parameter of a multicast message is decremented, i.e., decreased by one, by each computer which forwards the message such that the TTL parameter specifies an expiration condition in terms of network hops. In other networks, each computer which forwards a message decreases the TTL parameter of the message by an amount of time required to transfer the message to the computer such that the TTL parameter specifies an expiration condition in terms of an amount of time the message is permitted to travel. Some of the latter networks require that each computer decrease the TTL parameter by at least one second such that the TTL parameter specifies an expiration condition in terms of a combination of a maximum number of network hops and a maximum amount of time. When the TTL parameter of a multicast message is decreased below a predetermined threshold, which is typically zero, the multicast message is destroyed. The following example is illustrative.

Suppose computer 102A wishes to send a multicast message to computers 102B-G. Computer 102A can form a multicast message with a TTL parameter whose value is two. The message reaches computers 102B-D since computers 102B-D are coupled directly to computer 102A, through computer network 100. Computer 102D decrements the TTL parameter of the message to have a value of one and forwards the multicast message to computers 102E-H. Thus, computers 102B-G receive the multicast message. In addition, computer 102H receives the multicast message. Computer 102H decrements the TTL parameter of the multicast message to have a value of zero. Accordingly, computer 102H destroys the multicast message. As a result, the multicast message does not pass beyond computer 102H and does not unnecessarily burden the remainder of computer network 100.

To determine what value to which to set the TTL parameter of a particular multicast message, each computer of a computer network generally includes a database in which the distance to each other computer of the computer network in terms of TTL parameter values are stored. Such a distance is referred to as a TTL distance. To populate such a database, a computer of a computer network must generally be capable of determining such TTL distances. In computer networks in which header information of messages can be directly examined, such determination is a matter of comparing the difference between the initial and current values of the TTL parameter of messages from specific computers. However, initial TTL parameters of received messages are generally not stored in the header of such messages and, in a number of computer network environments, current TTL parameter values are not accessible.

One mechanism for determining TTL distances between computers of a computer network when current TTL parameter values cannot be directly examined is called an expanding ring search. In general, a multicast message with a TTL parameter whose value is one is sent through the computer network. All computers which respond are determined to have a TTL distance of one. Next, a multicast message with a TTL parameter whose value is two is sent through the computer network. All computers which respond are determined to have a TTL distance of two. Multicast messages with ever increasing TTL parameter values are sent and responses from such multicast messages are gathered to determine the TTL distances of all computers of the computer network.

Expanding ring search suffers from some disadvantages. First, expanding ring search is slow. In general, each computer of the computer network must respond to each multicast message before the next multicast message can be sent. In addition, the computer which sent the original multicast message determines that all computers have responded by waiting a predetermined amount of time. Such a predetermined amount of time can be several seconds in duration, and a complete expanding ring search can include several hundred multicast messages. As a result, determination of TTL distances using expanding ring search can take several minutes.

The second disadvantage of expanding ring searches is that such places a substantial burden on the computer network in terms of message traffic. Specifically, each computer of the computer network responds to each and every multicast message received. In a computer network which includes thousands of computers, each of several hundred multicast messages can elicit thousands of responding messages. Accordingly, expanding ring search can burden a large computer network with hundreds of thousands of messages. If each computer of such a computer network uses an expanding ring search to determine TTL distances to other computers of the computer network, the burden upon the computer network in terms of message traffic is enormous.

What is needed is a mechanism by which computers of a computer network can determine TTL distances to other computers of the computer network without requiring excessive amounts of time or of computer network bandwidth.

SUMMARY OF THE INVENTION

In accordance with the present invention, a base node of a computer network sends TTL query messages using multicast to other receiving nodes of the computer network. The base node is the node of the computer network from which TTL distances are to be measured. Each of the TTL query messages has a different TTL parameter value and records the TTL parameter of the TTL query message into a message body. The receiving nodes receive one or more of the TTL query messages, namely, those TTL query messages whose TTL parameter values are sufficient to allow the TTL query message to reach the receiving node. Each receiving node can determine the TTL distance to the receiving node from the base node by determining the lowest TTL parameter value of all TTL query messages which reached the receiving node. Each receiving node communicates the TTL distance by sending to the base node a TTL query response message which indicates, in the message body, the least TTL parameter value of all TTL query messages received by the receiving node.

Accordingly, the base node can determine TTL distances to other nodes of the computer network very quickly. Specifically, all TTL query messages can be sent concurrently. As a result, TTL distances throughout the computer network can be determined in the amount of time required for a message to travel to the furthest node of the computer network and for a return message to be received by the base node from the furthest node of the computer network.

BRIEF DESCRIPTION OF THE DRAWINGS

FIG. 6 is a block flow diagram of the processing by the computer system of FIG. 2 in response to receipt of a responding message from the computer system of FIG. 3.

FIG. 7 is a block diagram of a TTL query message sent by the computer system of FIG. 2 in accordance with the present invention.

FIG. 8 is a block diagram of a TTL response message received by the computer system of FIG. 2.

DETAILED DESCRIPTION

In accordance with the present invention, computers 102B-Y (FIG. 1) of computer network 100 collect TTL query messages from computer 102A during a TTL query period during which computer 102A determines the TTL distances of computer 102B-Y. Each of computers 102B-Y determines its TTL distance from computer 102A from the received TTL query messages and sends to computer 102A TTL query response messages which indicate to computer 102A respective TTL distances to computers 102B-Y. As described more completely below, TTL distance determination according to the present invention can accomplish in a few seconds that which expanding ring searches require several minutes to accomplish.

Figure 1:
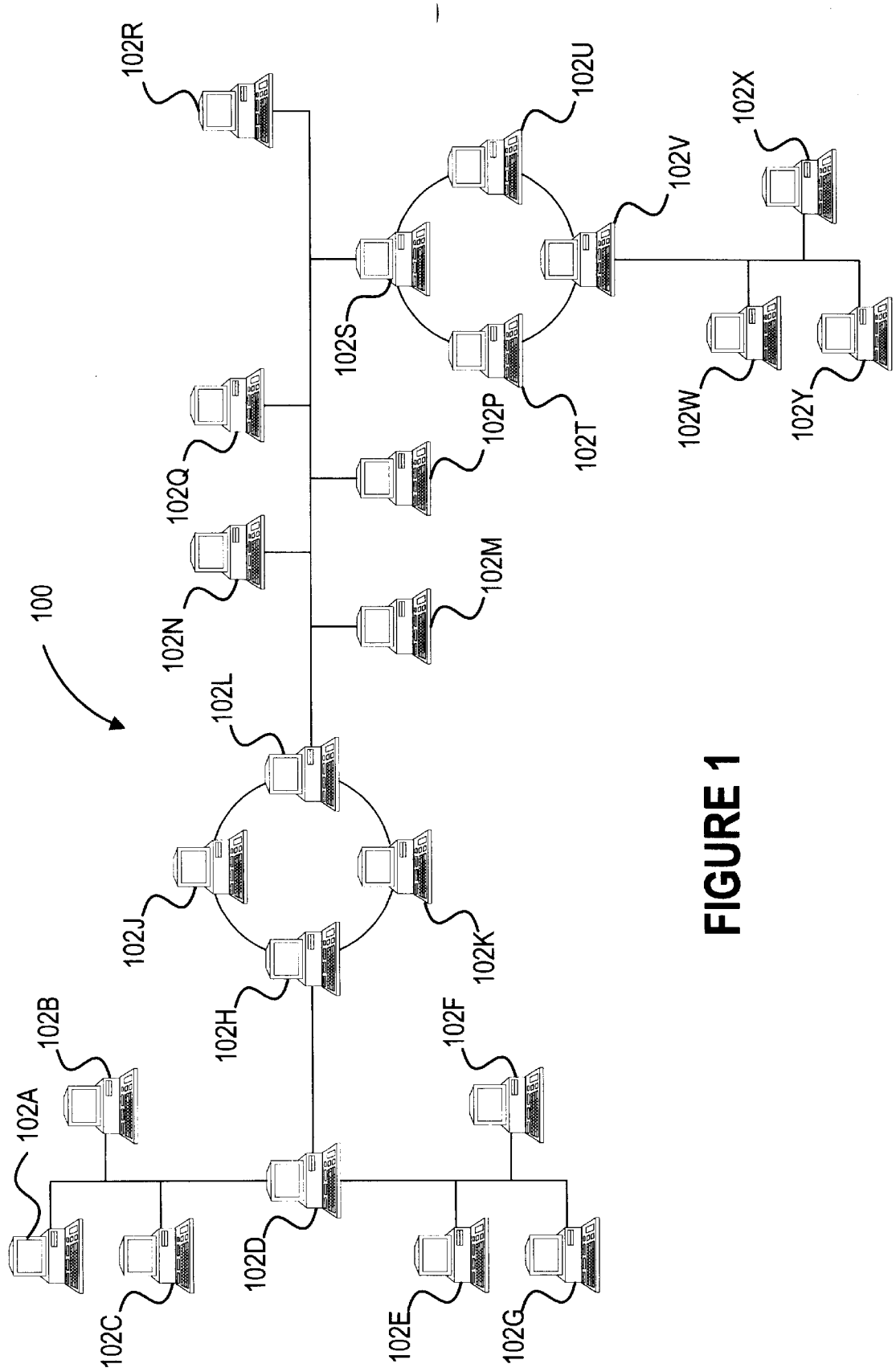
FIG. 1 is a computer network through which TTL distances can be determined in accordance with the present invention.
Figure 2:
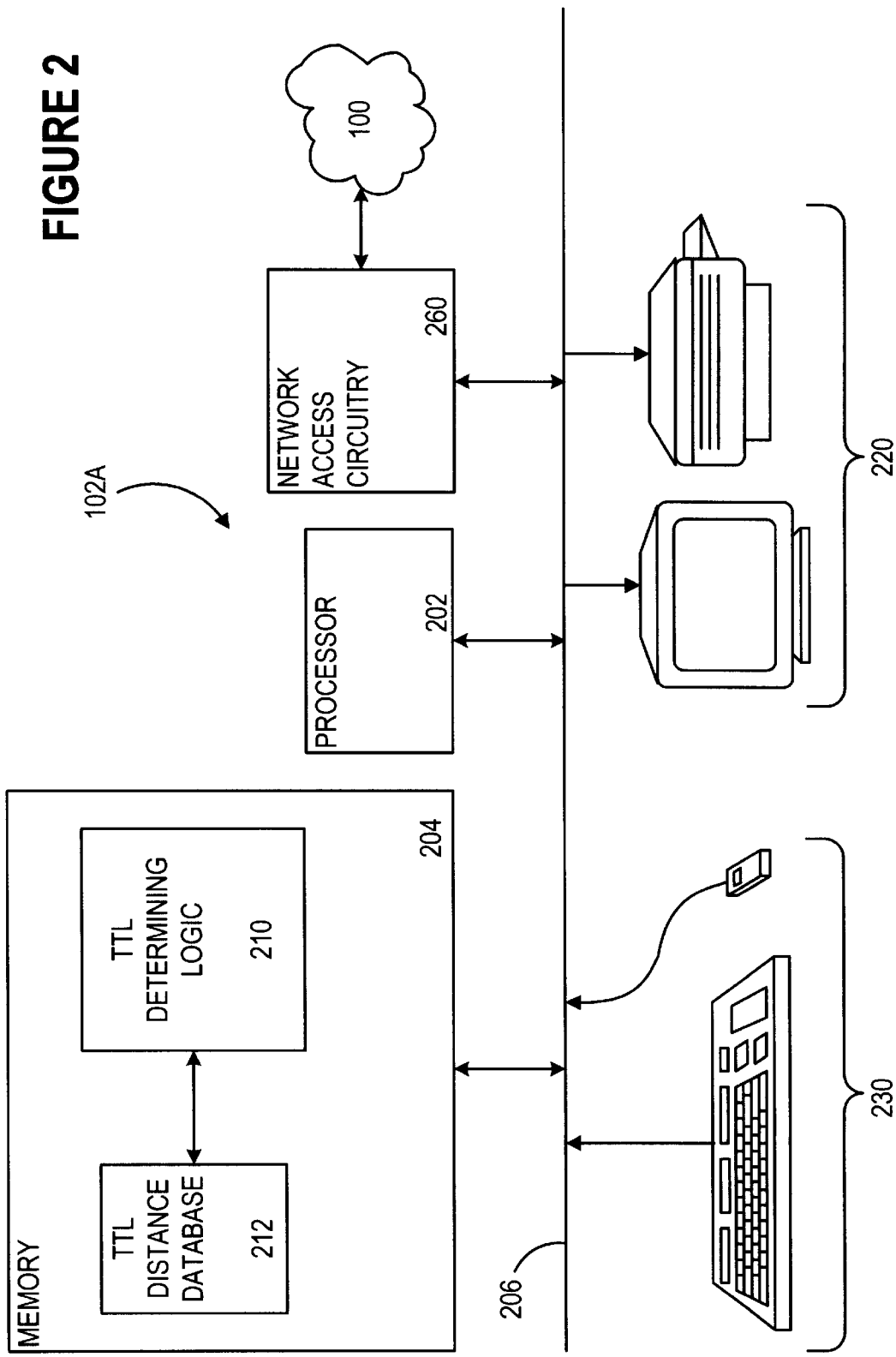
FIG. 2 is a block diagram of a sending computer system which determines TTL distances in accordance with the present invention.

Computer system 102A is shown in greater detail in FIG. 2. Computers 102A-Y (FIG. 1) are generally analogous to one another and the following description of computer 102A is equally applicable to each of computers 102B-Y. In addition, computers 102A-Y are all nodes of computer network 100. However, in the TTL distance determination by computer 102A described below, processing by computer 102A differs from processing by each of computers 102B-Y and that processing is described more completely below.

Computer 102A has a generally conventional architectural design which is known but is described herein for completeness. Computer 102A includes a processor 202 and memory 204 which is coupled to processor 202 through an interconnect 206. Interconnect 206 can be generally any interconnect mechanism for computer system components and can be, e.g., a bus, a crossbar, a mesh, a torus, or a hypercube. Processor 202 fetches from memory 204 computer instructions and executes the fetched computer instructions. In addition, processor 202 can fetch computer instructions through computer network 100 through network access circuitry 260 such as a modem or ethernet network access circuitry. Processor 202 also reads data from and writes data to memory 204 and sends data and control signals through interconnect 206 to one or more computer display devices 220 and receives data and control signals through interconnect 206 from one or more computer user input devices 230 in accordance with fetched and executed computer instructions.

Memory 204 can include any type of computer memory and can include, without limitation, randomly accessible memory (RAM), read-only memory (ROM), and storage devices which include storage media such as magnetic and/or optical disks. Memory 204 includes TTL determining logic 210 which is all or part of one or more computer processes which in turn executes within processor 202 from memory 204. A computer process is generally a collection of computer instructions and data which collectively define a task performed by a computer such as computer 102A.

Each of computer display devices 220 can be any type of computer display device including without limitation a printer, a cathode ray tube (CRT), a light-emitting diode (LED) display, or a liquid crystal display (LCD). Each of computer display devices 220 receives from processor 202 control signals and data and, in response to such control signals, displays the received data. Computer display devices 220, and the control thereof by processor 202, are conventional.

Each of user input devices 230 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 230 generates signals in response to physical manipulation by a user and transmits those signals through interconnect 206 to processor 202.

In one embodiment, processor 202 is an UltraSPARC processor and each of computers 102A-Y are SPARCstation computer systems, both of which are available from Sun Microsystems, Inc. of Palo Alto, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

TTL determining logic 210 of computer 102A executes within processor 202 from memory 204 to determine TTL distances between computer 102A and computers 102B-Y in the manner described more completely below. The determined TTL distances are stored in a TTL distance database 212 within memory 204. Computer systems 102B-Y cooperate with computer 102A in the manner described below according to TTL determining logic 310 (FIG. 3) of computer 102R. Computers 102B-Y cooperate in determination by computer 102A is an analogous manner. Accordingly, the following description of computer 102R is equally applicable to others of computers 102B-Y.

Computer 102R includes a processor 302 (FIG. 3), a memory 304, an interconnect 306, computer display devices 320, user input devices 330, and network access circuitry 360 which are analogous to processor 202 (FIG. 2), memory 204, interconnect 206, computer display devices 220, user input devices 230, and network access circuitry 260, respectively, of computer 102A as described above. In addition, computer 102R FIG. 3) includes TTL determining logic 310 which responds to TTL query messages in the manner described below.

TTL Query Message

Figure 4:
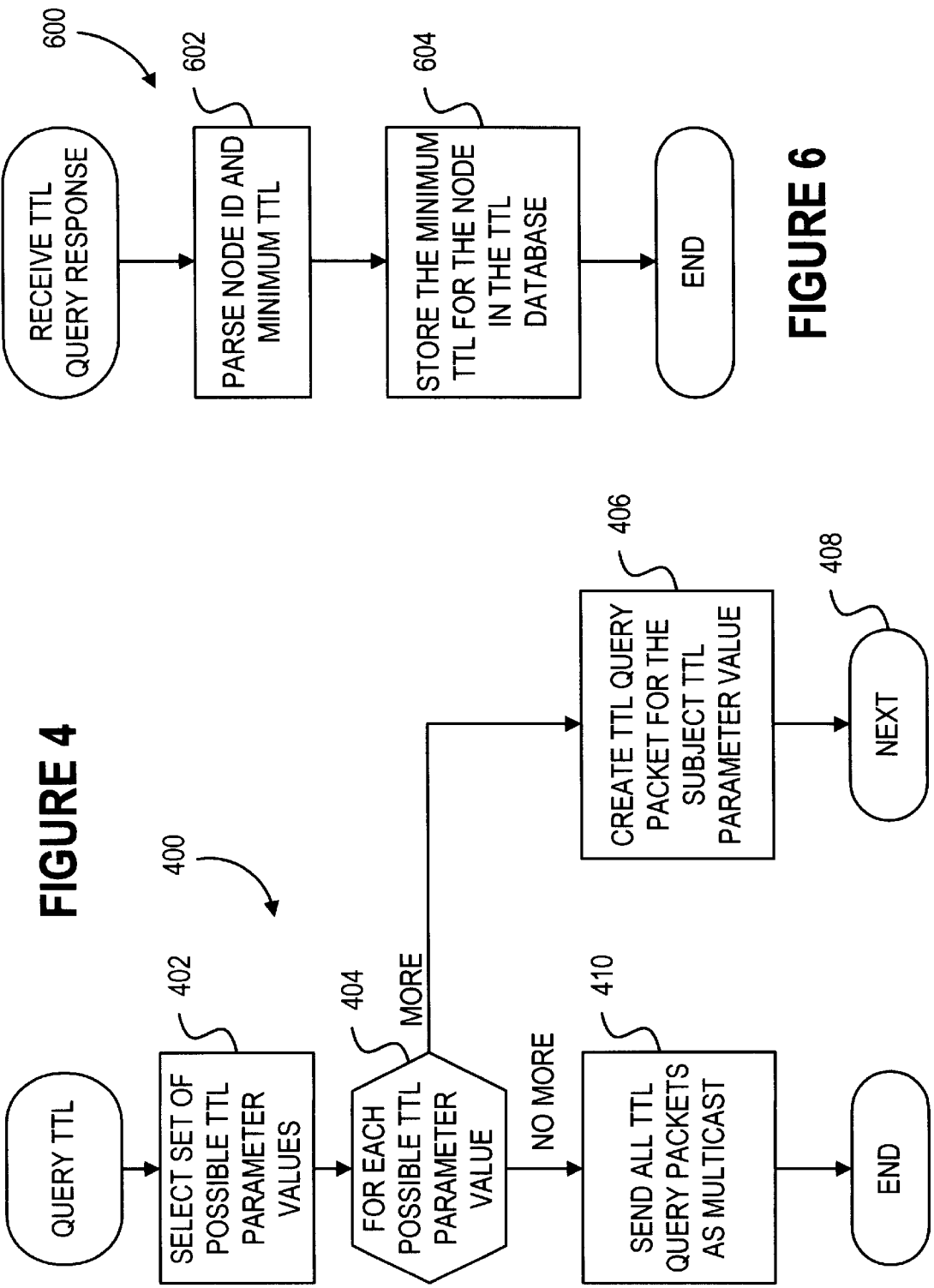
FIG. 4 is a logic flow diagram of the determination of TTL distances by the computer system of FIG. 2 in accordance with the present invention.

To initiate determination of TTL distances to computers 102B-Y (FIG. 1) relative to computer 102A, TTL determining logic 210 (FIG. 2) of computer 102A sends a number of TTL query messages in the manner shown as logic flow diagram 400 (FIG. 4). In step 402, TTL determining logic 210 (FIG. 2) selects a set of possible TTL parameter values to test. In one embodiment, TTL parameters are represented by 8 unsigned bits such that there are 255 possible TTL parameter values for unexpired messages and TTL determining logic 210 selects all 255 possible TTL parameter values for testing. In an alternative embodiment, TTL determining logic 210 selects less than all possible TTL parameter values, e.g., TTL parameter values which are multiples of an integer step value which is four (4) in one embodiment.

Loop step 404 FIG. 4) and next step 408 define a loop in which each of the possible TTL parameter values selected in step 402 is processed according to step 406. During each iteration of the loops of steps 404–408, the TTL parameter value processed according to step 406 is called the subject TTL parameter value. In step 406, TTL determining logic 210 (FIG. 2) creates a TTL query message which has a TTL parameter whose value is the subject TTL parameter value and has a data body which specifies the subject TTL parameter value. The structure of TTL query messages in accordance with the present invention is described below in greater detail. The data body of the message is the substantive portion of the message and, perhaps unlike parts of a header of the message which includes the TTL parameter, is accessible to recipients of the TTL query message. Thus, by including data representing the subject TTL parameter value in the body of the TTL query message, each of computers 102B-Y which receive the TTL query message can determine the initial value of the TTL parameter of the message notwithstanding lack of access to the TTL parameter itself.

From step 406 (FIG. 4), processing transfers through next step 408 to loop step 404 in which the next of the possible TTL parameter values selected in step 402 is processed according to the loop of steps 404–408. When all selected possible TTL parameter values have been so processed, processing transfers from loop step 404 to step 410.

In step 410, TTL determining logic 210 (FIG. 2) sends all TTL query messages formed in repeated performances of step 406 FIG. 4) through computer network 100 (FIG. 1) as multicast messages. In the embodiment in which TTL determining logic 210 (FIG. 2) selects all 255 possible TTL parameters values for testing, TTL determining logic 210 sends 255 TTL query messages, each with a respective one of the possible TTL parameter values as the value of the TTL parameter. In addition, the initial TTL parameter value of each of the TTL query messages is stored in the body of each message as described above and is therefore accessible by the recipient of each message.

After step 410 (FIG. 4), processing according to logic flow diagram 400 completes.

Processing in Response to the TTL Query Message

After TTL determining logic 210 (FIG. 2) sends the TTL query messages in step 410 (FIG. 4), computers 102B-Y (FIG. 1) receive the TTL query messages. The processing of TTL determining logic 310 (FIG. 3) of computer 102R is representative of the processing of analogous TTL determining logic in each of the others of computers 102B-Y (FIG. 1) in response to receiving TTL query messages and is illustrated as logic flow diagram 500 (FIG. 5).

In step 502, TTL determining logic 310 (FIG. 3) of computer 102R receives a TTL query message from TTL determining logic 210 (FIG. 2) of computer 102A through computer network 100. In general, TTL determining logic 310 (FIG. 3) has no specific knowledge regarding the number and TTL parameter values of the TTL query messages sent by computer 102A (FIG. 1) and furthermore is uncertain as to which of the TTL query messages are expected to reach computer 102R. Specifically, some of the TTL query messages sent by computer 102A have TTL parameter values which are so low that these TTL query messages expire prior to reaching computer 102R Accordingly, in step 504 (FIG. 5), TTL determining logic 310 (FIG. 3) starts a timer which measures a predetermined period of time during which TTL determining logic 310 assumes additional TTL query messages can be en route to computer 102R from computer 102A (FIG. 1). In one embodiment, the predetermined amount of time is ten seconds.

In steps 506–516 (FIG. 5), TTL determining logic 310 (FIG. 3) collects TTL query messages during the predetermined period of time and determines the lowest TTL parameter value of all TTL query messages received by computer 102R. The lowest TTL parameter value of any TTL query message to reach computer 102R is determined by TTL determining logic 310 to be the TTL distance between computers 102A (FIG. 1) and 102B. A message from computer 102A to computer 102R with a lower TTL parameter value would not reach computer 102R, and a message from computer 102A to computer 102R with a greater TTL parameter value would travel further than necessary through computer network 100 consuming excess bandwidth of computer network 100.

Figure 5:
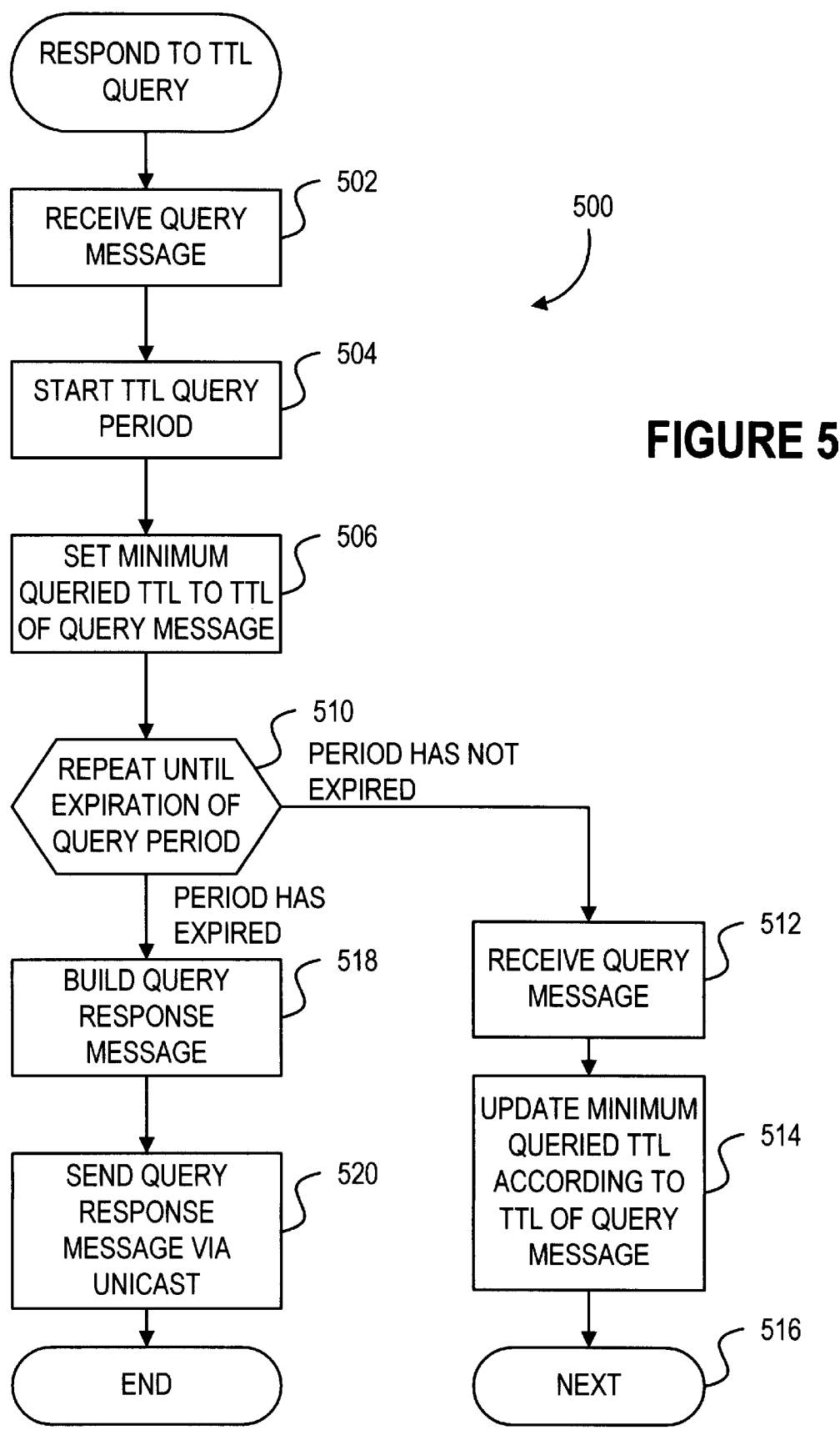
FIG. 5 is a logic flow diagram of the processing by the computer system of FIG. 3 in response to receipt of a TTL distance query message from the computer system of FIG. 2 in accordance with the present invention.

Specifically, TTL determining logic 310 (FIG. 3) initializes a minimum TTL parameter value 314 to the TTL parameter value stored in the body of the TTL query message received in step 502 (FIG. 5). Loop step 510 and next step 516 define a loop in which TTL determining logic 310 (FIG. 3) repeatedly performs steps 512–514 (FIG. 5) during the predetermined period of time. In step 512, TTL determining logic 310 (FIG. 3) receives another TTL query message from computer 102A (FIG. 1) through computer network 100. In step 516 (FIG. 5), TTL determining logic 310 (FIG. 3) updates minimum TTL parameter value 314 according to the TTL parameter value represented in the body of the TTL query message received in step 514 (FIG. 5). In particular, minimum TTL parameter value 314 (FIG. 3) is replaced with the TTL parameter value retrieved from the received TTL query message if the retrieved TTL parameter value is less than the previous value of minimum TTL parameter value 314.

Figure 3:
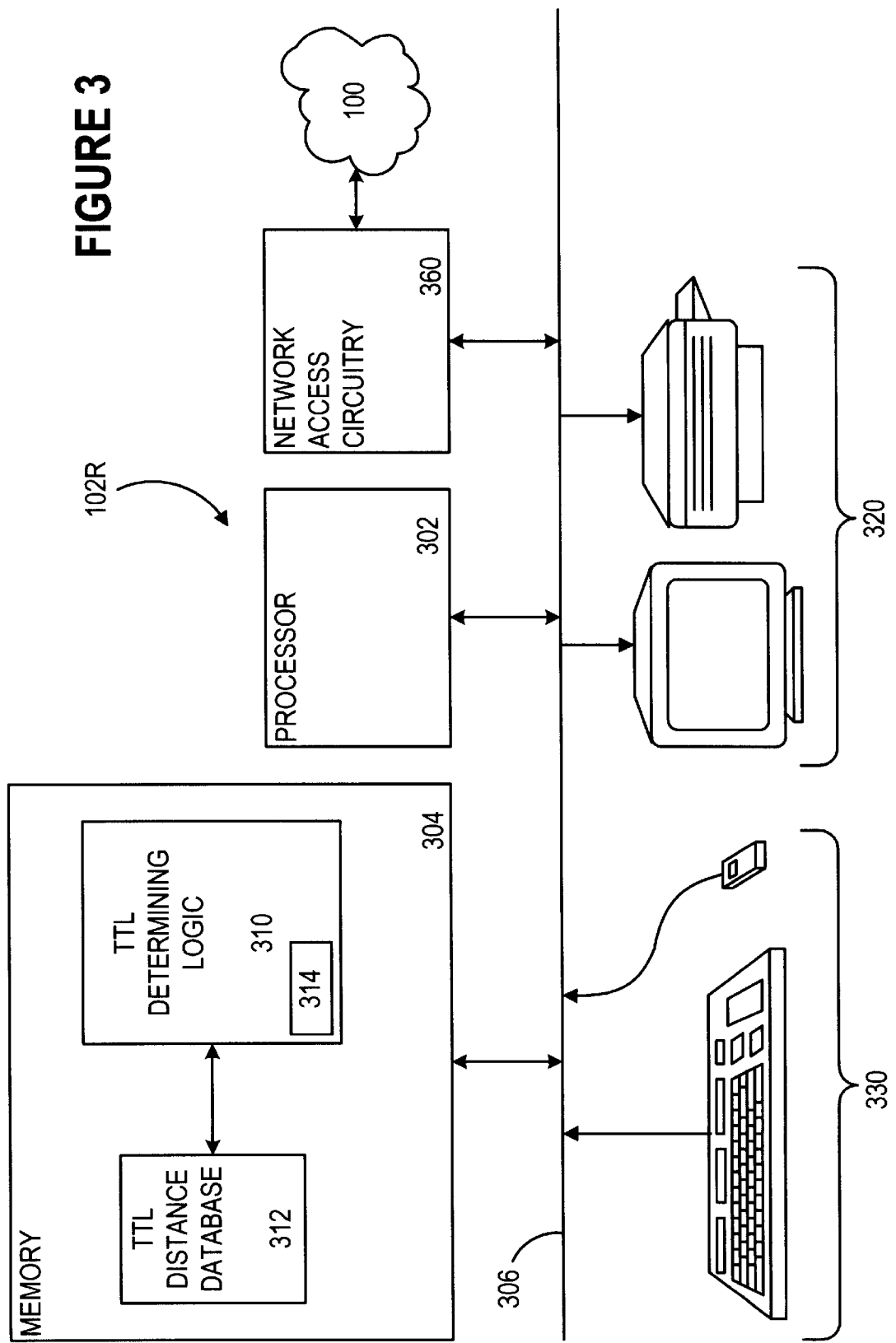
FIG. 3 is a block diagram of a receiving computer system which response to a TTL distance query message received from the computer system of FIG. 2 in accordance with the present invention.

Steps 512–514 (FIG. 5) are repeated until the predetermined period of time expires. After expiration of the predetermined period of time, processing transfers from loop step 510 (FIG. 5) to step 518. In step 518, TTL determining logic 310 (FIG. 3) builds a TTL query response message which includes, in the body of the message, data representing the minimum TTL parameter value of all received TTL query messages as represented in minimum TTL parameter value 314. In step 520 (FIG. 5), TTL determining logic 310 (FIG. 3) sends the TTL query response message built in step 518 FIG. 5) to computer 102A (FIG. 1) to indicate to computer 102A the determined TTL distance between computers 102A and 102R as represented in minimum TTL parameter value 314 (FIG. 3). In one embodiment, the TTL query response message is a unicast message.

Each time TTL determining logic 210 (FIG. 2) of computer 102A receives a TTL query response message, TTL determining logic 210 processes the TTL query response message according to logic flow diagram 600 FIG. 6). In step 602, TTL determining logic 210 (FIG. 2) retrieves sender identification data and minimum TTL parameter value data from the received TTL query response message. The sender identification data indicates which of computers 102B-Y (FIG. 1) sent the TTL query response message, and the minimum TTL parameter value data indicates the TTL distance between computer 102A and the indicated one of computers 102B-Y. In step 604 FIG. 6), TTL determining logic 210 (FIG. 2) stored the identification data and minimum TTL parameter value data in TTL distance database 212.

In one embodiment, TTL determining logic 210 (FIG. 2) replaces TTL distance records within TTL distance database 212 only for those of computers 102B-Y from which TTL query response messages are received. Other TTL distance records within TTL distance database 212 remain unchanged and no time limit is imposed upon computers 102B-Y for responding to TTL query messages sent by TTL determining logic 210 (FIG. 2) in step 410 (FIG. 4).

In an alternative embodiment, TTL determining logic 210 (FIG. 2) waits for a predetermined period of time for TTL query response messages from computers 102B-Y (FIG. 1). For those of computers 102B-Y from which TTL determining logic 210 (FIG. 2) does not receive a TTL query response message, TTL determining logic 210 stores a TTL distance record, which indicates that the TTL distance to the computers from computer 102A is undetermined, in TTL distance database 212. In this alternative embodiment, the predetermined period of time during which TTL determining logic 210 waits for TTL query response messages from the time at which TTL determining logic 210 sends the TTL query messages in step 410 (FIG. 4) is twice the predetermined period of time during which computers 102B-Y receive the TTL query messages, e.g., twenty (20) seconds which is twice ten (10) seconds.

Thus, TTL determining logic 210 (FIG. 2) of computer 102A sends out a number of TTL query messages and receives, in response thereto, TTL query response messages which indicate the TTL distances to respective ones of computers 102B-Y (FIG. 1). At most, TTL determining logic 210 FIG. 2) waits a few seconds from the time TTL query messages are sent to the time TTL query response messages are received and TTL distances to all of computers 102B-Y (FIG. 1) are determined. By comparison, expanding ring searches require numerous rounds during which query and response messages are sent and received and therefore requires many times the amount of time to successfully determine TTL distances to various computers of a computer network. In addition, only one TTL query response message is needed from each of computers 102B-Y to successfully determine TTL distances from computer 102A to each of computers 102B-Y according to the present invention. By comparison, each queried computer generally must respond to each of numerous queries in expanding ring searches, therefore burdening the computer network with many times more message traffic. As a result, determining TTL distances according to the present invention requires much less time and bandwidth than does expanding ring searching.

Query Message and Query Response Message Structure

Figure 9A:
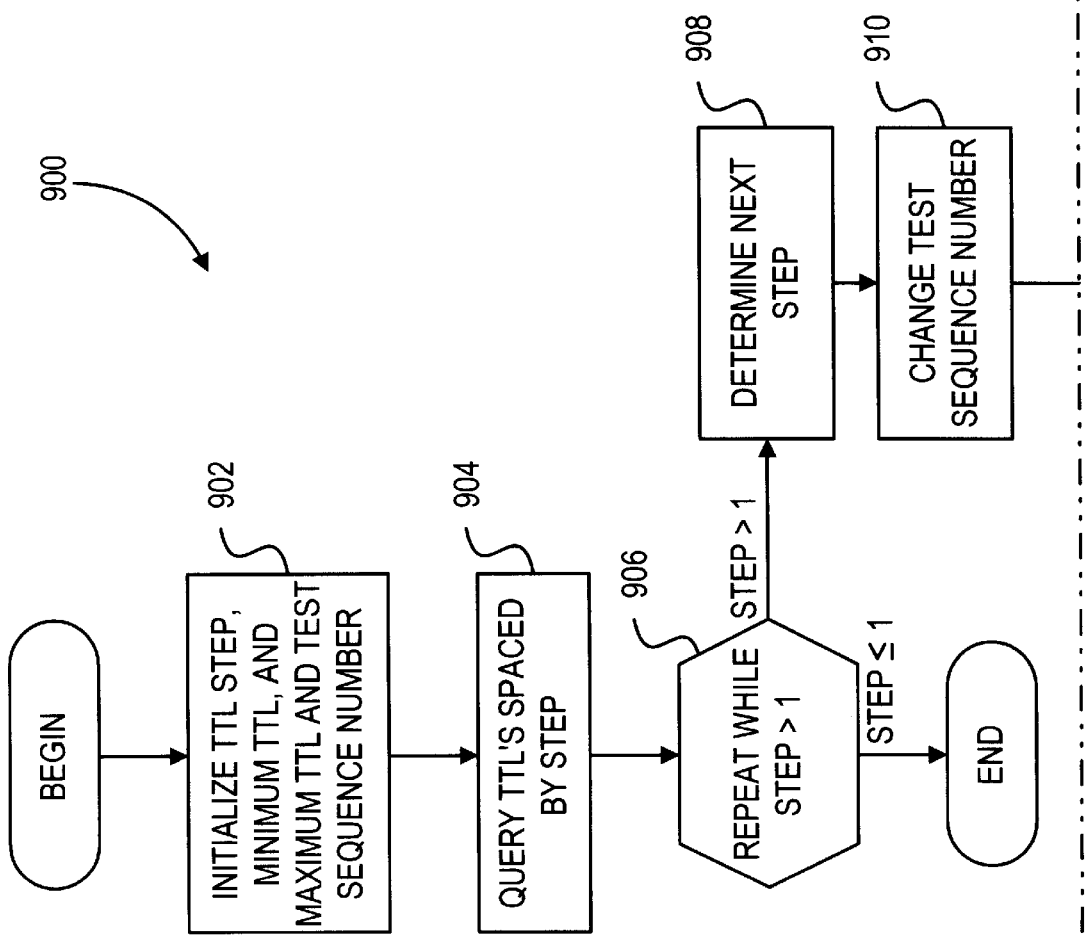
FIG. 9 is a logic flow diagram of the processing by the computer system of FIG. 2 to determine TTL distances in a manner which uses less computer network bandwidth in accordance with the present invention.

FIG. 7 shows a TTL query message 700 which is created by TTL determination logic 210 (FIG. 2) in step 406 (FIG. 4). TTL query message 700 FIG. 7) is sixty-four bits in length and includes a number of fields 702–710. Type field 702 is eight bits in length and stores data which identifies TTL query message 700 as a TTL query message. Flags field 704 is eight bits in length and each of the bits represents a binary component of the state of TTL query message 700. In one embodiment, only one of the bits of flags field 704 is used and that flag indicates whether all recipients of TTL query message 700 are expected to send a TTL query response message in response thereto. This flag is used in a manner described more completely below with respect to logic flow diagram 900 (FIG. 9).

Reserved field 706 (FIG. 7) is sixteen bits in length and is not used. Reserved field 706 serves to align TTL value field 708 on a 32-bit boundary and is omitted in an alternative embodiment. TTL value field 708 is sixteen bits in length and includes data representing the initial TTL parameter value of TTL query message 700. Accordingly, TTL determining logic 310 (FIG. 3) can access the initial value of the TTL parameter of TTL query message 700 by retrieving TTL value field 708 even if the initial value of the TTL parameter of TTL query message 700 is unaccessible by TTL determining logic 310 (FIG. 3). Test sequence field 710 is sixteen bits in length and stores data identifying a particular performance of the steps of logic flow diagram 400 (FIG. 4) from other performances of the steps of logic flow diagram 400 by TTL determining logic 210 (FIG. 2).

FIG. 8 shows a TTL query response message 800 which is created by TTL determining logic 310 (FIG. 3) in step 518 (FIG. 5). TTL query response message 800 (FIG. 8) includes a type field 802, a reserved field 806, a TTL value field 808, and a test sequence field 810. Type field 802 is eight bits in length and identifies TTL query response message 800 as a TTL query response message. Reserved field 806 is twenty-four bits in length and is not used. Reserved field 806 serves to align TTL value field 808 on a 32-bit boundary and is omitted in an alternative embodiment.

TTL value field 808 contains data which specifies a TTL distance between the source of TTL query response message 800 and the source of the TTL query message to which TTL query response message 800 responds. Test sequence 810 is sixteen bits in length and stores data identifying a particular collection of TTL query messages to which TTL query response message 800 corresponds. For example, a number of TTL query messages can be sent substantially simultaneously by computer 102A (FIG. 1) in step 410 (FIG. 4) as described above. Each of the messages sent in a single performance of step 410 share a relatively unique test sequence number which is specified in test sequence field 710 (FIG. 7) of each such TTL query message. As described above with respect to logic flow diagram 500 (FIG. 5), each computer which responds to such TTL query messages does so with a single TTL query response message which communicates to computer 102A the lowest TTL parameter value of all TTL query messages received by the computer. The series of TTL query messages to which TTL query response message 800 (FIG. 8) corresponds is identified by data stored in test sequence field 810.

TTL Determination Using an Iterative Narrowing Search

To determine TTL distances according to the system described above with maximum precision can require sending a large number of multicast messages concurrently. For example, if the TTL parameter of each multicast message can have any of 255 different values and maximum precision is desired, 255 separate multicast TTL query messages are sent concurrently. Such can add more message congestion in a computer network than is desirable. Message congestion is reduced at the expense of additional time to determine TTL distances with maximum precision using an iterative narrowing search in accordance with logic flow diagram 900 FIG. 9).

Logic flow diagram 900 is described in the illustrative example in which TTL determining logic 210 (FIG. 2) of computer 102A performs the steps of logic flow diagram 900 (FIG. 9) to determine TTL distances to computers 102B-Y (FIG. 1). Processing begins with step 902 (FIG. 9).

In step 902, TTL determining logic 210 FIG. 2) initializes TTL step, maximum TTL, and minimum TTL values. In one embodiment, the TTL step, maximum TTL, and minimum TTL values are initialized to sixteen, 255, and one, respectively. The TTL step, maximum TTL, and minimum TTL values specify a number of TTL parameter values to be tested in a single collection of concurrent TTL query messages. The initial values specify the collection of TTL parameter values of 16, 32, 48, . . . , 240, and 255, i.e., integer multiples of the TTL step value up to, and including, the maximum TTL value. TTL determining logic 210 also initializes a test sequence number to an initial value which is relative unique, i.e., is unique with respect to recently used test sequence numbers in step 902 (FIG. 9).

In step 904, TTL determining logic 210 FIG. 2) queries computers 102B-Y for TTL distances to computers 102B-Y in the manner described above with respect to logic flow diagram 400 (FIG. 4) using TTL query messages with TTL parameter values of the collection of TTL parameter values initialized in step 902 (FIG. 9). The TTL query messages include the test sequence number set in step 902. Computers 102B-Y (FIG. 1) respond to the TTL query messages sent in step 904 (FIG. 9) in the manner described above. TTL determining logic 210 (FIG. 2) therefore determines, to a precision represented by the TTL step value, TTL distances to computers 102B-Y. For example, if a computer responds with a TTL query response message which indicates a TTL distance to the computer of 48, TTL determining logic 210 (FIG. 2) has determined that multicast messages with TTL parameter values of 48 will reach the computer and multicast messages with TTL parameter values of 32 will not.

Processing by TTL determining logic 210 transfers to loop step 906. Loop step 906 and next step 924 define a loop within which TTL determining logic 210 (FIG. 2) iteratively narrows the search for increasingly accurate TTL distances according to steps 908–922 (FIG. 9) for different TTL step values. TTL determining logic 210 (FIG. 2) repeatedly performs steps 908–922 (FIG. 9) until the TTL step value is decreased below some predetermined threshold, which is one in this illustrative embodiment.

For each TTL step value, processing transfers to step 908. In step 908, TTL determining logic 210 (FIG. 2) determines a next TTL step value. In this illustrative embodiment, the next TTL step value is four. It is preferred that the next TTL step value is less than the current TTL step value. Processing transfers to step 910 in which TTL determining logic 210 (FIG. 2) changes the test sequence number to a new relatively unique test sequence number to refer to a separate round, i.e., a separate performance of the loop of steps 906–924 FIG. 9).

Loop step 912 and next step 918 define a loop within which TTL determining logic 210 (FIG. 2) processes individual TTL ranges defined by TTL step, minimum step, and maximum step values. In this illustrative embodiment, the TTL ranges include 1–16, 17–32, 33–48, . . . , 224–240, and 241–255. For each TTL range, processing transfers to test step 914 FIG. 9). During each iteration of the loop of steps 912–918, the TTL range processed by TTL determining logic 210 (FIG. 2) is referred to as the subject TTL range.

In test step 914 (FIG. 9), TTL determining logic 210 (FIG. 2) determines whether any computers of interest have TTL distances within the subject TTL range. Computers of interest are those computers for which TTL determining logic 210 is configured to determine TTL distances. TTL determining logic 210 determines whether a particular computer has a TTL distance within the subject TTL range by comparing a TTL distance to the particular computer as stored in TTL distance database 212 to the bounds of the subject TTL range. If no computers of interest have TTL distances in the subject TTL range, processing transfers through next step 918 (FIG. 9) to loop step 910 and no TTL query messages are sent for the subject TTL range. Accordingly, TTL determining logic 210 (FIG. 2) avoids sending unnecessary TTL query messages when TTL determining logic 210 has determined that no computers of interest have TTL distances of a particular TTL range. Message traffic through computer network 100 (FIG. 1) is therefore reduced.

Conversely, if TTL determining logic 210 (FIG. 2) determines in test step 914 (FIG. 9) that one or more computers of interest have TTL distances within the subject TTL range, processing transfers to step 916 in which TTL determining logic 210 (FIG. 2) determines with greater precision, as specified by the next TTL step value, TTL distances to computers of interest whose TTL distances are within the subject TTL range. TTL determining logic 210 FIG. 2) does so by forming and sending a number of TTL query messages representing TTL parameter values within the subject TTL range spaced from one another by the next TTL step value. For example, if the subject TTL range is 17–32 and the next TTL step value is four, TTL determining logic 210 forms and sends TTL query messages representing TTL parameter values 20, 24, 28, and 32 in the manner described above with respect to logic flow diagram 400 (FIG. 4).

It should be noted that TTL determining logic 210 FIG. 2) can send TTL query messages during a particular performance of step 916 (FIG. 9) prior to receiving TTL query response messages in response to TTL query messages sent during a previous performance of step 916. In other words, TTL determining logic 210 (FIG. 2) can be awaiting response from TTL query messages sent during different performances of step 916 FIG. 9). All TTL query messages sent in step 916 include the test sequence number established in step 910 as described above. As described below with respect to logic flow diagram 1000 (FIG. 10), responding computers respond to TTL query message according to test sequence number and according to previously sent TTL query messages. After step 916 (FIG. 9), processing by TTL determining logic 210 (FIG. 2) transfers through next step 918 (FIG. 9) to loop step 912.

After all TTL ranges have been processed by TTL determining logic 210 (FIG. 2) according to the loop of steps 912–918 (FIG. 9), processing transfers to step 920 in which TTL determining logic 210 (FIG. 2) awaits TTL query response messages in response to TTL query messages sent in various performances of step 916 (FIG. 9) in the manner described above for a predetermined period of time, e.g., twenty (20) seconds. After step 920, TTL determining logic 210 (FIG. 2) has determined TTL distances to all computers of interest, e.g., computers 102B-Y, to a precision specified by the next TTL step value. In step 922 (FIG. 9), TTL determining logic 210 FIG. 2) updates the TTL step value to the next TTL step value as determined in step 908 FIG. 9).

After step 922, processing transfers through next step 924 to loop step 906 in which processing according to steps 908–922 repeats if the TTL step value is greater than the predetermined threshold or in which processing according to logic flow diagram 900 completes otherwise.

In one embodiment, the TTL step value is initialized to a value of sixteen (16) in step 902 and is updated in repeated performances of step 922 to have values of four (4) and one (1), after which processing according to logic flow diagram 900 completes. Thus, in step 904, TTL determining logic 210 (FIG. 2) determines the least TTL parameter value which is an integer multiple of an initial TTL step value, e.g., sixteen, which is sufficient for a multicast message to reach each of a number of computers. In the first performance of step 916 (FIG. 9), TTL determining logic 210 (FIG. 2) determines the least TTL parameter value which is an integer value of a smaller TTL step value, e.g., four, which is sufficient for a multicast message to reach each of a number of computers. In the second performance of step 916 (FIG. 9), TTL determining logic 210 (FIG. 2) determines the least TTL parameter value which is an integer value of a smaller TTL step value, e.g., one, which is sufficient for a multicast message to reach each of a number of computers. Accordingly, TTL determining logic 210 determines TTL distances to computers 102B-Y with maximum precision in only three rounds. Such is significantly more efficient than expanding ring searches described above. In addition, TTL determining logic 210 sends a number of concurrent multicast messages which is only one-sixteenth of the number of possible TTL parameter values in step 904 (FIG. 9). In step 916, TTL determining logic 210 (FIG. 2) sends relatively few, e.g., four, concurrent multicast messages when needed to determine with greater precision TTL distances to specific computers. Accordingly, multicast message traffic through computer network 100 (FIG. 1) is substantially reduced while still requiring substantially less time than required by expanding ring searching as described above.

Processing by receiving computers of TTL query messages sent by computer 102A according to logic flow diagram 900 (FIG. 9) is generally as described above with respect to logic flow diagram 500 (FIG. 5) but is modified as represented by logic flow diagram 1000 (FIG. 10) to reduce the number of TLL query response messages sent by such receiving computers, e.g., computers 102B-Y.

In step 1002, TTL determining logic 310 (FIG. 3) receives a TTL query message in the manner described above with respect to step 502 FIG. 5). In step 1004 (FIG. 10), TTL determining logic 310 (FIG. 3) retrieves the sequence number from test sequence field 710 (FIG. 7) of the received TTL query message and records the received sequence number as a current sequence number. In step 1006 FIG. 10), TTL determining logic 310 (FIG. 3) starts a timer which measures a predetermined period of time during which TTL determining logic 310 assumes additional TTL query messages can be en route to computer 102R from computer 102A (FIG. 1) in the manner described above with respect to step 504 (FIG. 5).

In step 1008 (FIG. 10), TTL determining logic 310 (FIG. 3) determines whether all recipients of the TTL query message are to respond by retrieving from flags field 704 (FIG. 7) of the received TTL query message the flag whose value indicates whether all recipients are to respond. If the flag is set to indicate that all recipients are expected to respond, processing transfers to step 1010 FIG. 10). Otherwise, processing transfers directly to loop step 1012 and step 1010 is skipped.

In step 1010, TTL determining logic 310 FIG. 3) sets minimum TTL parameter value 314 in the manner described above with respect to step 506 (FIG. 5). In addition, TTL parameter value 314 contains data indicating whether the value stored in TTL parameter value 314 has been communicated to the sender of the received TTL query message. In step 1010 (FIG. 10), TTL determining logic 310 (FIG. 3) stored data in minimum TTL parameter value 314 to indicate that the minimum TTL parameter value has not yet been communicated to computer 102A (FIG. 1).

Figure 10A:
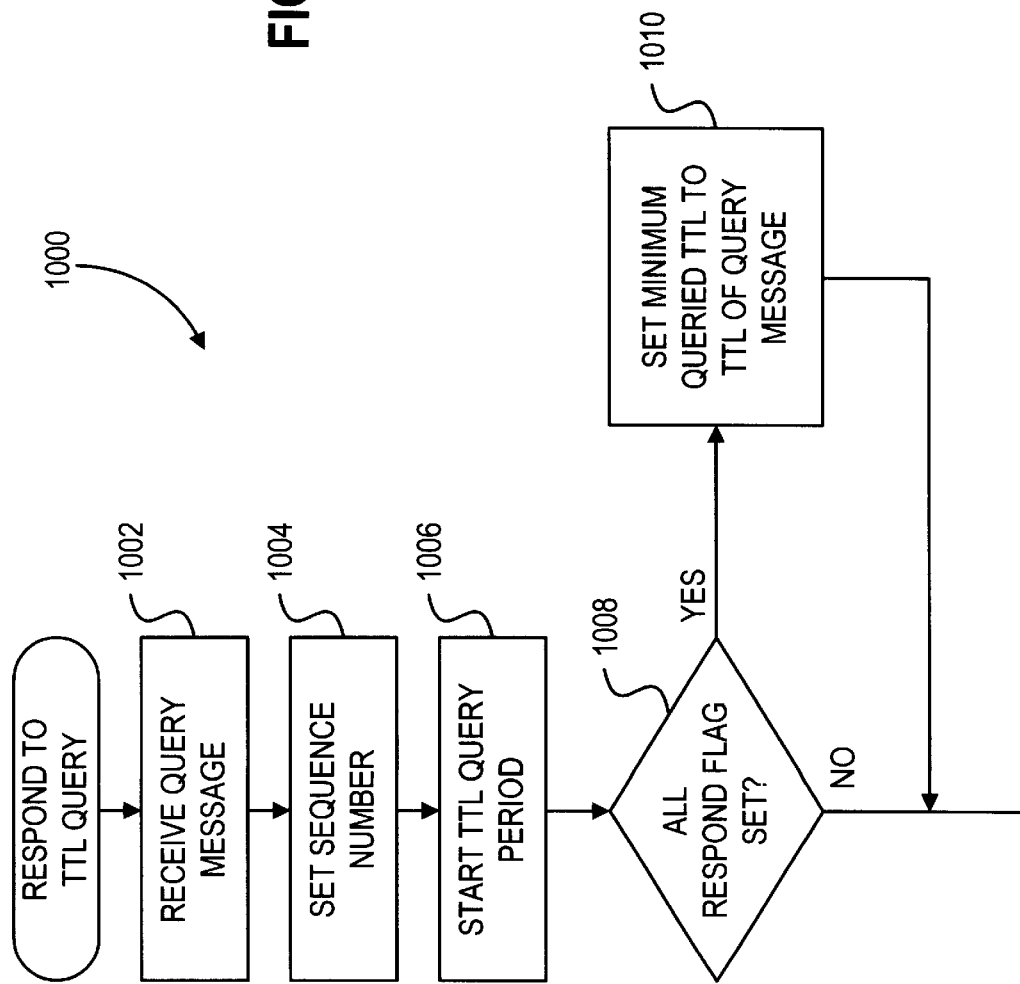
FIG. 10 is a logic flow diagram of the processing by the computer system of FIG. 3 in response to TTL query messages received from the computer system of FIG. 2 in a manner which further reduces consumed computer network bandwidth.

In the manner described above with respect to steps 510 (FIG. 5) and 516, steps 1012 (FIG. 10) and 1020 define a loop in which TTL determining logic 310 (FIG. 3) repeatedly performs steps 1014–1018 (FIG. 10) until the predetermined period of time started in step 1006 expires. In step 1014, TTL determining logic 310 (FIG. 3) receives another TTL query message in the manner described above with respect to step 512 (FIG. 5). TTL determining logic 310 FIG. 3) determines whether the received TTL query message pertains to the current sequence in step 1016 (FIG. 10) by comparing data stored in test sequence field 710 (FIG. 7) of the received TTL query message to data specifying the current test sequence as recorded in step 1004 (FIG. 10). If the TTL query message is not of the current test sequence, processing transfers through next step 1020 to loop step 1012 and step 1018 is skipped. Conversely, if the received TTL query message is of the current test sequence, processing transfers to step 1018.

In step 1018, TTL determining logic 310 (FIG. 3) updates minimum TTL parameter value 314 in the manner described above with respect to step 514 (FIG. 5). In addition, if the TTL parameter value of the received TTL query message is less than the TTL parameter value recorded in minimum TTL parameter value 314 (FIG. 3), TTL determining logic 310 (i) stores the TTL parameter value of the received TTL query message in minimum TTL parameter value 314 and (ii) stores data in minimum TTL parameter value 314 indicating that the value stored in minimum parameter value 314 has not yet been communicated to the sender of the received TTL query message. After step 1018 (FIG. 10), processing transfers through next step 1020 to loop step 1012.

When the predetermined period expires, processing transfers from loop step 1012 to test step 1022. In test step 1022, TTL determining logic 310 FIG. 3) determines whether the value represented in minimum TTL parameter value 314 has been communicated to the sender of the TTL query messages. The value of minimum TTL parameter value 314 generally has been communicated to the sender if, during a previous performance of the steps of logic flow diagram 1000 (FIG. 10), (i) a TTL parameter value was sent according to step 1026 in a previous test sequence, (ii) no TTL query message received in step 1014 in the current test sequence had a lower TTL parameter value, and (iii) the all respond flag was determined to be cleared in test step 1008 in the current test sequence. Conversely, the value of minimum TTL parameter value 314 (FIG. 3) generally has not been sent if (i) the all respond flag was determined to be set in test step 1008 or (ii) at least one TTL query message received in step 1014 in the current test sequence had a lower TTL parameter value than the most recently communicated TTL parameter value.

If minimum TTL parameter value 314 (FIG. 3) has not been communicated to the sender of TTL query messages, processing transfers from test step 1022 (FIG. 10) to step 1024. In step 1024, TTL determining logic 310 (FIG. 3) builds a TTL query response message and stores in TTL value field 808 (FIG. 8) minimum TTL parameter value 314 (FIG. 3) in the manner described above with respect to step 518 (FIG. 5). In step 1026 (FIG. 10), TTL determining logic 310 (FIG. 3) sends the TTL query response message in the manner described above with respect to step 520 (FIG. 5). In addition, TTL determining logic 310 (FIG. 3) stores data in minimum TTL parameter value 314 to indicate that the value stored in minimum TTL parameter value 314 has been communicated to computer 102A.

After step 1026 (FIG. 10), processing according to logic flow diagram 1000 completes. In addition, if TTL determining logic 310 (FIG. 3) determines in test step 1022 (FIG. 10) that the value represented in minimum TTL parameter value 314 FIG. 3) has been communicated to computer 102A, processing according to logic flow diagram 1000 (FIG. 10) completes and steps 1024–1026 are skipped. Thus, TTL determining logic 310 (FIG. 3) avoids sending TTL query response messages when TTL determining logic 310 has already sent a TTL query response message with the same or lower TTL parameter value. As a result, congestion of computer network 100 (FIG. 1) is reduced.

Customization of TTL Distance Determination

TTL determining logic 210 fFigure 2) can use specific knowledge of the configuration of computer network 100 to more efficiently determine TTL distances to computers 102B-Y (FIG. 1), e.g., by avoiding sending unnecessary TTL query messages. For example, if TTL parameters can have values ranging from one to 255 but TTL determining logic 210 (FIG. 2) knows that no computer of computer network 100 has a TTL distance greater than 64, TTL determining logic 210 can send TTL query messages having TTL parameters values in the range of one to 64. Accordingly, TTL determining logic 210 sends 192 fewer TTL query messages.

In addition, TTL determining logic 210 can use specific knowledge of the distribution of TTL distances to tailor the determination of TTL distances. For example, TTL determining logic 210 can have specific knowledge that 90% of the computers of interest have TTL distances of eight or less, 98% have TTL distances of 12 or less, and 100% have TTL distances of 64 or less. TTL determining logic 210 can send TTL query messages with TTL parameter values of 4, 8, 12, 32, and 64 in a first test sequence and can use an iterative narrowing search in the manner described above with respect to logic flow diagram 900 (FIG. 9) to ascertain TTL distances with greater precision.

The above description is illustrative only and is not limiting. The present invention is limited only by the claims which follow.

What is claimed is:

1. A method for determining relative distances between a base node and at least one other node of a computer network, the method comprising:

sending through the computer network at least two query messages, each of which includes:
   an expiration parameter which specifies an expiration condition for the query message; and
   a data body which includes data specifying the expiration condition of the query message as specified in the expiration parameter of the query message;

receiving, from a recipient one of the other nodes, a query response message which includes data specifying a quickest expiration of at least one received one of the query messages which is received by the recipient node, wherein the quickest expiration is determined according to the respective expiration conditions of the received query messages as specified in the data body of the received query message;

wherein the quickest expiration relates to the relative distance.

2. The method of claim 1 wherein the expiration parameter is a time-to-live parameter.

3. The method of claim I wherein the expiration condition of each of the query messages specifies an amount of time from the sending of the query message at which the query message expires.

4. The method of claim 1 wherein the expiration condition of each of the query messages specifies a number of hops through the computer network such that the query message expires after completing the number of hops.

5. The method of claim 1 wherein the quickest expiration specified by the query response message indicates a range of possible distances between the base node and the recipient node, the method further comprising:

sending through the computer network at least two additional query messages, each of which includes:
- an expiration parameter which specifies an expiration condition for the additional query message wherein the expiration condition corresponds to a distance within the range of possible distances; and
- a data body which includes data specifying the expiration condition of the additional query message as specified in the expiration parameter of the additional query message; and receiving, from the recipient node, a subsequent query response message which includes data specifying a new quickest expiration of at least one received one of the additional query messages which is received by the recipient node, wherein the new quickest expiration is determined according to the respective expiration conditions of the received additional query messages as specified in the data body of the received additional query message.

6. A method for determining relative distances between a base node and at least one other nodes of a computer network, the method comprising:

receiving, from the base node through the computer network, at least one query message, each of which includes:
- an expiration parameter which specifies an expiration condition for the query message; and
- a data body which includes data specifying the expiration condition of the query message as specified in the expiration parameter of the query message; and determining a quickest expiration of the at least one query message, wherein the quickest expiration is determined according to the respective expiration conditions of the query messages as specified in the data body of the query message;

wherein the quickest expiration relates to the relative distance.

7. The method of claim 6 further comprising:
sending, to the base node, a query response message which includes data specifying the quickest expiration.

8. The method of claim 6 wherein the expiration parameter is a time-to-live parameter.

9. The method of claim 6 wherein the expiration condition of each of the query messages specifies an amount of time from the sending of the query message at which the query message expires.

10. The method of claim 6 wherein the expiration condition of each of the query messages specifies a number of hops through the computer network such that the query message expires after completing the number of hops.

11. A computer readable medium useful in association with a computer which includes a processor and a memory, the computer readable medium including computer instructions which are configured to cause the computer to determine relative distances between a base node and at least one other nodes of a computer network, the computer instructions comprising:

a sending module which is configured to send through the computer network at least two query messages, each of which includes:
- an expiration parameter which specifies an expiration condition for the query message; and
- a data body which includes data specifying the expiration condition of the query message as specified in the expiration parameter of the query message; and a receiving module which is operatively coupled to the sending module and which is configured to receive, from a recipient one of the other nodes, a query response message which includes data specifying a quickest expiration of at least one received one of the query messages which are received by the recipient node, wherein the quickest expiration is determined according to the respective expiration conditions of the received query messages as specified in the data body of the received query messages;

wherein the quickest expiration relates to the relative distance.

12. The computer readable medium of claim 11 wherein the expiration parameter is a time-to-live parameter.

13. The computer readable medium of claim 11 wherein the expiration condition of each of the query messages specifies an amount of time from the sending of the query message at which the query message expires.

14. The computer readable medium of claim 11 wherein the expiration condition of each of the query messages specifies a number of hops through the computer network such that the query message expires after completing the number of hops.

15. The computer readable medium of claim 11 wherein the quickest expiration specified by the query response message indicates a range of possible distances between the base node and the recipient node, further wherein the computer instructions further comprise:

a second sending module which is operatively coupled to the receiving module and which is configured to send through the computer network at least two additional query messages, each of which includes:
- an expiration parameter which specifies an expiration condition for the additional query message wherein the expiration condition corresponds to a distance within the range of possible distances; and
- a data body which includes data specifying the expiration condition of the additional query message as specified in the expiration parameter of the additional query message; and a second receiving module which is operatively coupled to the second sending module and which is configured to receive, from the recipient node, a subsequent query response message which includes data specifying a new quickest expiration of at least one received one of the additional query messages which are received by the recipient node, wherein the new quickest expiration is determined according to the respective expiration conditions of the received additional query messages as specified in the data body of the received additional query messages.

16. A computer readable medium useful in association with a computer which includes a processor and a memory, the computer readable medium including computer instructions which are configured to cause the computer to determine relative distances between a base node and one or more other nodes of a computer network, the computer instructions comprising:

a receiving module which is configured to receive, from the base node through the computer network, at least one query message, each of which includes:
- an expiration parameter which specifies an expiration condition for the query message; and
- a data body which includes data specifying the expiration condition of the query message as specified in the expiration parameter of the query message; and a comparison module which is operatively coupled to the receiving module and which is configured to determine a quickest expiration of the at least one query message, wherein the quickest expiration is determined according to the respective expiration conditions of the query messages as specified in the data body of the query messages;

wherein the quickest expiration relates to the relative distance.

17. The computer readable medium of claim 16 wherein the computer instructions further comprise:

a sending module which is operatively coupled to the comparison module and which is configured to send, to the base node, a query response message which includes data specifying the quickest expiration.

18. The computer readable medium of claim 16 wherein the expiration parameter is a time-to-live parameter.

19. The computer readable medium of claim 16 wherein the expiration condition of each of the query messages specifies an amount of time from the sending of the query message at which the query message expires.

20. The computer readable medium of claim 16 wherein the expiration condition of each of the query messages specifies a number of hops through the computer network such that the query message expires after completing the number of hops.

21. A computer system comprising:

a processor;

a memory operatively coupled to the processor; and distance determining logic which executes in the processor from the memory and which, when executed by the processor, causes the computer to determine relative distances between the computer system and at least one other node through a computer network, the distance determining logic comprising:

a sending module which is configured to send through the computer network at least two query messages, each of which includes:

an expiration parameter which specifies an expiration condition for the query message; and a data body which includes data specifying the expiration condition of the query message as specified in the expiration parameter of the query message; and a receiving module which is operatively coupled to the sending module and which is configured to receive, from a recipient one of the other nodes, a query response message which includes data specifying a quickest expiration of at least one received ones of the query messages which are received by the recipient node, wherein the quickest expiration is determined according to the respective expiration conditions of the received query messages as specified in the data body of the received query messages;

wherein the quickest expiration relates to the relative distance.

22. The computer system of claim 21 wherein the expiration parameter is a time-to-live parameter.

23. The computer system of claim 21 wherein the expiration condition of each of the query messages specifies an amount of time from the sending of the query message at which the query message expires.

24. The computer system of claim 21 wherein the expiration condition of each of the query messages specifies a number of hops through the computer network such that the query message expires after completing the number of hops.

25. The computer system of claim 21 wherein the quickest expiration specified by the query response message indicates a range of possible distances between the base node and the recipient node, further wherein the distance determining logic further comprises:

a second sending module which is operatively coupled to the receiving module and which is configured to send through the computer network at least two additional query messages, each of which includes:

an expiration parameter which specifies an expiration condition for the additional query message wherein the expiration condition corresponds to a distance within the range of possible distances; and a data body which includes data specifying the expiration condition of the additional query message as specified in the expiration parameter of the additional query message; and a second receiving module which is operatively coupled to the second sending module and which is configured to receive, from the recipient node, a subsequent query response message which includes data specifying a new quickest expiration of at least one received one of the additional query messages which is received by the recipient node, wherein the new quickest expiration is determined according to the respective expiration conditions of the received additional query messages as specified in the data body of the received additional query messages.

26. A computer system comprising:

a processor;

a memory operatively coupled to the processor; and distance determining logic which executes in the processor from the memory and which, when executed by the processor, causes the computer to determine relative distances between the computer system and a base node through a computer network, the distance determining logic comprising:

a receiving module which is configured to receive, from the base node through the computer network, at least one query message, each of which includes:

an expiration parameter which specifies an expiration condition for the query message; and a data body which includes data specifying the expiration condition of the query message as specified in the expiration parameter of the query message; and a comparison module which is operatively coupled to the receiving module and which is configured to determine a quickest expiration of the at least one query message, wherein the quickest expiration is determined according to the respective expiration conditions of the query messages as specified in the data body of the query messages;

wherein the quickest expiration relates to the relative distance.

27. The computer system of claim 26 wherein the distance determining logic further comprises:

a sending module which is operatively coupled to the comparison module and which is configured to send, to the base node, a query response message which includes data specifying the quickest expiration.

28. The computer system of claim 26 wherein the expiration parameter is a time-to-live parameter.

29. The computer system of claim 26 wherein the expiration condition of each of the query messages specifies an amount of time from the sending of the query message at which the query message expires.

30. The computer system of claim 26 wherein the expiration condition of each of the query messages specifies a number of hops through the computer network such that the query message expires after completing the number of hops.

31. An apparatus for determining relative distances between a base node and at least one other node of a computer network, the apparatus comprising:

means for sending through the computer network at least two query messages, each of which includes:
an expiration parameter which specifies an expiration condition for the query message; and
a data body which includes data specifying the expiration condition of the query message as specified in the expiration parameter of the query message; and means for receiving, from a recipient one of the other nodes, a query response message which includes data specifying a quickest expiration of at least one received one of the query messages which is received by the recipient node, wherein the quickest expiration is determined according to the respective expiration conditions of the received query messages as specified in the data body of the received query message;

wherein the quickest expiration relates to the relative distance.

32. The apparatus of claim 31 wherein the quickest expiration specified by the query response message indicates a range of possible distances between the base node and the recipient node, the apparatus further comprising:

means for sending through the computer network at least two additional query messages, each of which includes:
an expiration parameter which specifies an expiration condition for the additional query message wherein the expiration condition corresponds to a distance within the range of possible distances; and
a data body which includes data specifying the expiration condition of the additional query message as specified in the expiration parameter of the additional query message; and means for receiving, from the recipient node, a subsequent query response message which includes data specifying a new quickest expiration of at least one received one of the additional query messages which is received by the recipient node, wherein the new quickest expiration is determined according to the respective expiration conditions of the received additional query messages as specified in the data body of the received additional query message.

33. An apparatus for determining relative distances between a base node and at least one other nodes of a computer network, the apparatus comprising:

means for receiving, from the base node through the computer network, at least one query message, each of which includes:
an expiration parameter which specifies an expiration condition for the query message; and
a data body which includes data specifying the expiration condition of the query message as specified in the expiration parameter of the query message; and means for determining a quickest expiration of the at least one query message, wherein the quickest expiration is determined according to the respective expiration conditions of the query messages as specified in the data body of the query message;

wherein the quickest expiration relates to the relative distance.

34. The apparatus of claim 33 further comprising:

means for sending, to the base node, a query response message which includes data specifying the quickest expiration.

* * * * *